(12) United States Patent
Kats et al.

(10) Patent No.: US 6,211,473 B1
(45) Date of Patent: *Apr. 3, 2001

(54) ELECTRONIC WEIGHING APPARATUS UTILIZING SURFACE ACOUSTIC WAVES

(75) Inventors: Vyacheslav D. Kats, East Rockaway; Arnold S. Gordon, Woodmere, both of NY (US)

(73) Assignee: Circuits and Systems, Inc., East Rockaway, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/327,707

(22) Filed: Jun. 8, 1999

Related U.S. Application Data

(63) Continuation-in-part of application No. 08/729,752, filed on Oct. 7, 1996, now Pat. No. 5,910,647, which is a continuation of application No. 08/489,365, filed on Jun. 12, 1995, now Pat. No. 5,663,531.

(51) Int. Cl.$^7$ ........................................ G01G 3/14
(52) U.S. Cl. ......................... 177/210 R; 177/210 FP; 73/862.59
(58) Field of Search ................. 73/862.59; 177/210 FP, 177/210 R, 229

(56) References Cited

U.S. PATENT DOCUMENTS

| | | | |
|---|---|---|---|
| 4,096,740 | 6/1978 | Sallee | 73/88.5 |
| 4,107,626 | 8/1978 | Kiewit | 177/210 FP |
| 4,294,321 | 10/1981 | Wittlinger et al. | 177/210 |
| 4,623,813 | 11/1986 | Naito et al. | 177/210 FP |
| 4,858,145 | 8/1989 | Inoue et al. | 177/210 FP |
| 4,957,177 | * 9/1990 | Hamilton et al. | 177/211 |
| 5,476,002 | 12/1995 | Bowers et al. | 73/24.01 |
| 5,663,531 | 9/1997 | Kats | 177/210 FP |
| 5,910,647 | 6/1999 | Kats et al. | 177/210 FP |

FOREIGN PATENT DOCUMENTS 0386680    11/1994   (SU) .

OTHER PUBLICATIONS

"Progress in the development of SAW resonator pressure transducers" by Cullen et al., 1980 Ultrasonics Symposium, pp. 696–701.

"Pressure and acceleration sensitivity of SAW Interferometer" by Staples et al., 1981 Ultrasonics Symposium, pp. 155–158.

Article entitled "Displacement Measurement by SAW Delay–Line Oscillator Consisting of TwoLiNbO$_3$ Plates with IDT" by Ishido, Imaizumi, and Toyoda in IEEE, Mar. 1987, pp. 83–86.

Article entitled "A 200 MHz surface acoustic wave resonator mass microbalance" by Bowers, Chuan, and Duong, in Review of Scientific Instruments, Jun. 1991, pp. 1624–1629.

* cited by examiner

*Primary Examiner*—Randy W. Gibson
(74) *Attorney, Agent, or Firm*—David P. Gordon; David S. Jacobson; Thomas A Gallagher

(57) ABSTRACT

A weighing apparatus includes a base supporting a cantilevered elastic member bearing a load platform. The interior of the elastic member is hollowed and is provided with first and second piezoelectric transducers mounted on respective opposed posts. The transducers are arranged substantially parallel to each other with a small gap between them and are coupled to an amplifier to form a "delay line" and a positive feedback loop, i.e. a natural oscillator. According to various aspects of the invention, one or both substrates is provided with anti-reflection structure; the transducers are sealed from moisture; an hermetically sealed temperature transducer is provided to compensate for the effects of temperature gradients; a thermal transducer channel is provided on the same substrate to measure the effects of temperature gradients and thereby compensate for temperature effects; a pair of differential transducers is arranged to measure the effects of temperature changes in the same acoustic channel in which displacement measurements are made; and a phase shift is applied to the output of the amplifier(s) to improve gain.

7 Claims, 15 Drawing Sheets

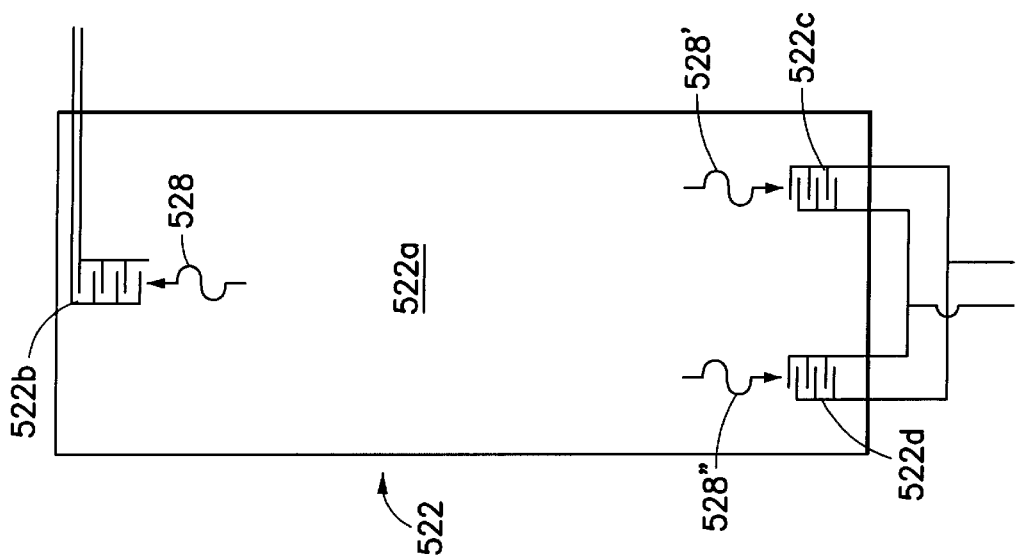
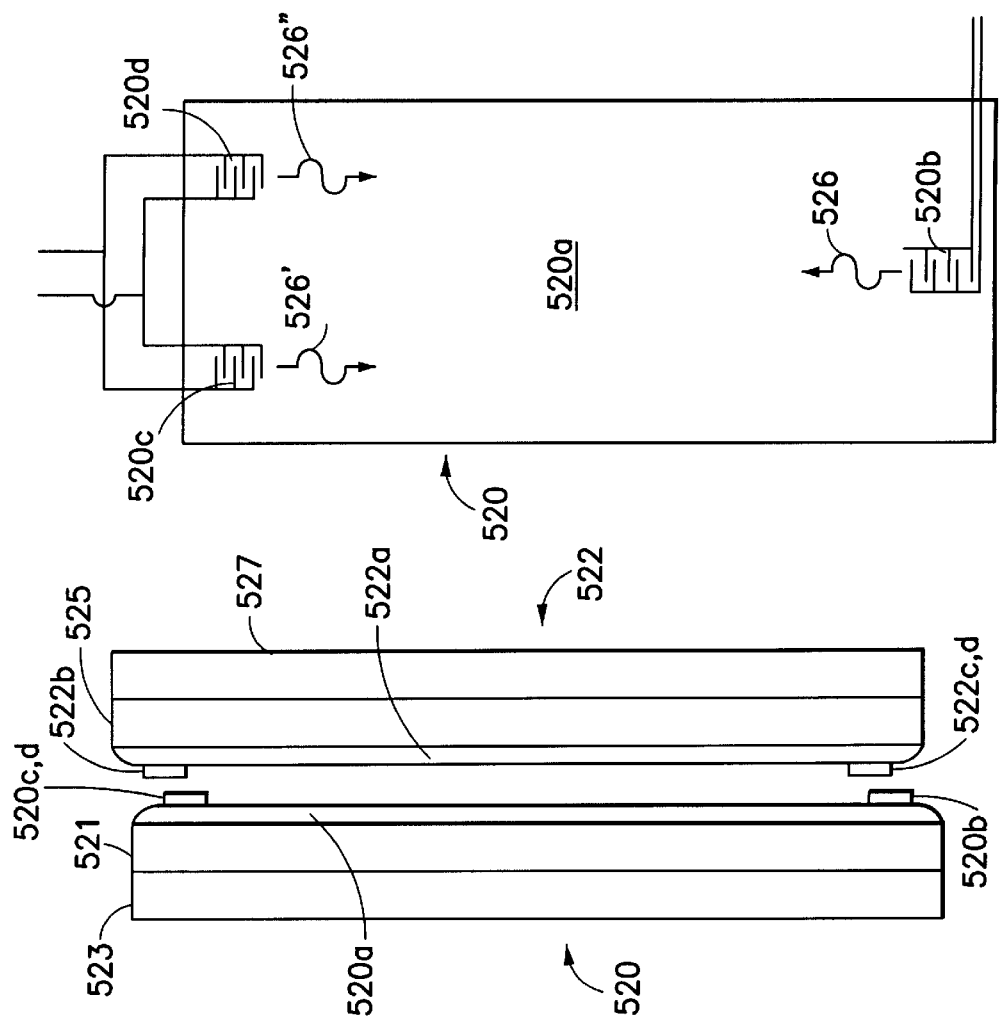

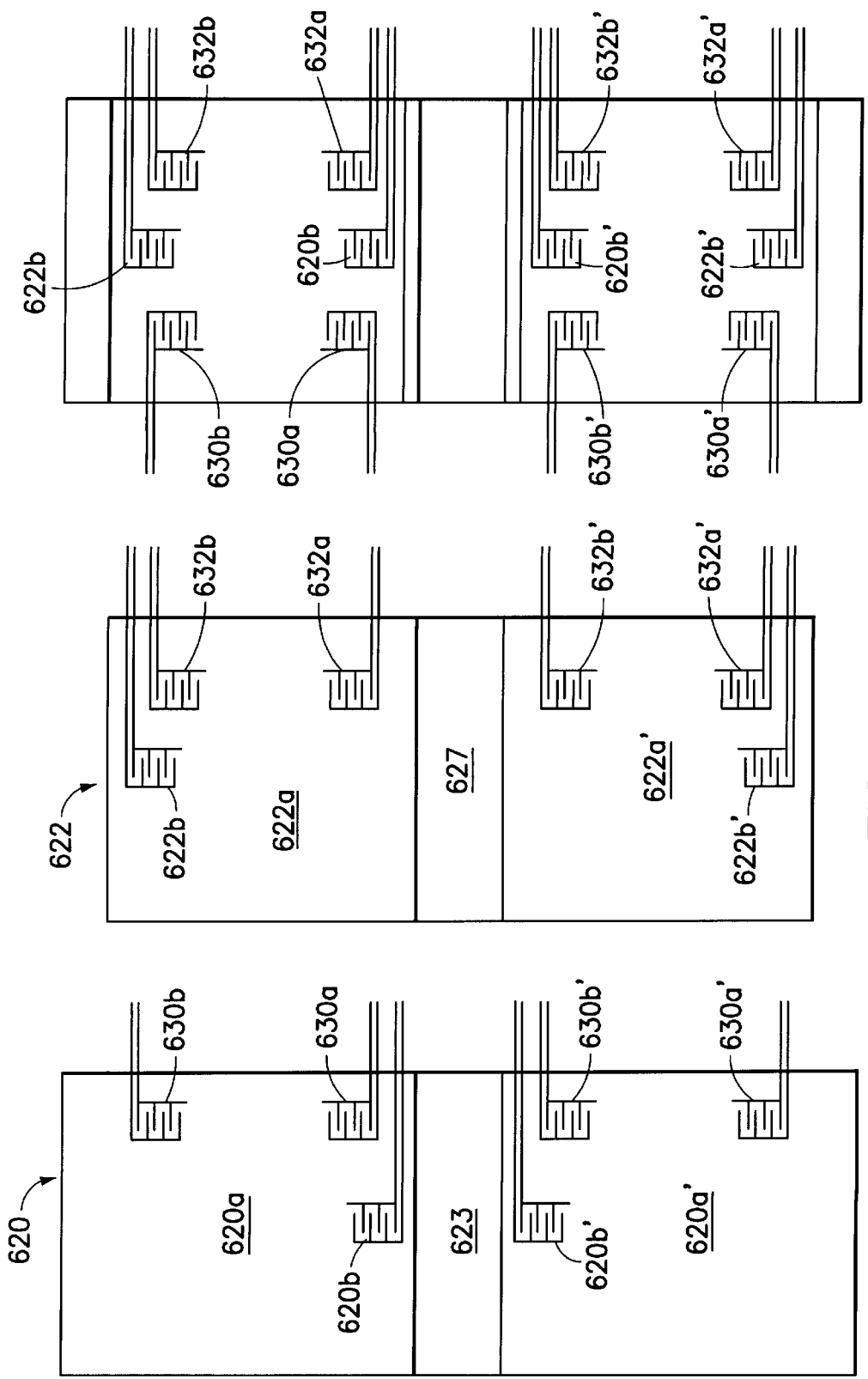

US 6,211,473 B1

ELECTRONIC WEIGHING APPARATUS UTILIZING SURFACE ACOUSTIC WAVES

This application is a continuation-in-part of co-owned application Ser. No. 08/729,752 filed Oct. 7, 1996, now U.S. Pat. No. 5,910,647, which was a continuation 08/489,365 filed Jun. 12, 1995, now U.S. Pat. No. 5,663,531, the complete disclosures of which are hereby incorporated by reference herein.

BACKGROUND OF THE INVENTION

1. Field of the Invention

The invention relates to electronic weighing devices. More particularly, the invention relates to an electronic weighing device which employs surface acoustic waves to measure weight.

2. State of the Art

Precision electronic weighing devices are widely known in the art and there are many different technologies utilized in these electronic weighing devices. Laboratory scales or "balances" typically have a capacity of about 1,200 grams and a resolution of about 0.1 gram, although scales with the same resolution and a range of 12,000 grams are available. The accuracy of these scales is achieved through the use of a technology known as magnetic force restoration. Generally, magnetic force restoration involves the use of an electromagnet to oppose the weight on the scale platform. The greater the weight on the platform, the greater the electrical current needed to maintain the weight. While these scales are very accurate (up to one part in 120,000), they are expensive and very sensitive to ambient temperature. In addition, their range is relatively limited.

Most all other electronic weighing devices use load cell technology. In load cell scales, the applied weight compresses a column which has strain gauges bonded to its surface. The strain gauge is a fine wire which undergoes a change in electrical resistance when it is either stretched or compressed. A measurement of this change in resistance yields a measure of the applied weight. Load cell scales are used in non-critical weighing operations and usually have a resolution of about one part in 3,000. The maximum resolution available in a load cell scale is about one part in 10,000 which is insufficient for many critical weighing operations. However, load cell scales can have a capacity of several thousand pounds.

While there have been many improvements in electronic weighing apparatus, there remains a current need for electronic weighing apparatus which have enhanced accuracy, expanded range, and low cost.

Co-owned application Ser. No. 08/489,365, previously incorporated by reference herein, discloses an electronic weighing apparatus having a base which supports a cantilevered elastic member upon which a load platform is mounted. The free end of the elastic member is provided with a first piezoelectric transducer and a second piezoelectric transducer is supported by the base. Each transducer includes a substantially rectangular piezoelectric substrate and a pair of electrodes imprinted on the substrate at one end thereof, with one pair of electrodes acting as a transmitter and the other pair of electrodes acting as a receiver. The transducers are arranged with their substrates substantially parallel to each other with a small gap between them and with their respective electrodes in relatively opposite positions. The receiver electrodes of the second transducer are coupled to the input of an amplifier and the output of the amplifier is coupled to the transmitter electrodes of the first transducer. The transducers form a "delay line" and the resulting circuit of the delay line and the amplifier is a positive feedback loop, i.e. a natural oscillator. More particularly, the output of the amplifier causes the first transducer to emit a surface acoustic wave ("SAW") which propagates along the surface of the first transducer substrate away from its electrodes. The propagating waves in the first transducer induce an oscillating electric field in the substrate which in turn induces similar SAW waves on the surface of the second transducer substrate which propagate in the same direction along the surface of the second transducer substrate toward the electrodes of the second transducer. The induced waves in the second transducer cause it to produce an alternating voltage which is supplied by the electrodes of the second transducer to the amplifier input. The circuit acts as a natural oscillator, with the output of the amplifier having a particular frequency which depends on the physical characteristics of the transducers and their distance from each other, as well as the distance between the respective electrodes of the transducers.

When a load is applied to the load platform, the free end of the cantilevered elastic member moves and causes the first transducer to move relative to the second transducer. The movement of the first transducer relative to the second transducer causes a change in the frequency at the output of the amplifier. The movement of the elastic member is proportional to the weight of the applied load and the frequency and/or change in frequency at the output of the amplifier can be calibrated to the displacement of the elastic member. The frequency response of the delay line is represented by a series of lobes. Each mode of oscillation is defined as a frequency where the sum of the phases in the oscillator is an integer multiple of $2\pi$. Thus, as the frequency of the oscillator changes, the modes of oscillation move through the frequency response curve and are separated from each other by a phase shift of $2\pi$. The mode at which the oscillator will oscillate is the one having the least loss. The transducers are arranged such that their displacement over the weight range of the weighing apparatus causes the oscillator to oscillate in more than one mode. Therefore, the change in frequency of the oscillator as plotted against displacement of the transducers is a periodic function. There are several different ways of determining the cycle of the periodic function so that the exact displacement of the elastic member may be determined. In addition, in order to minimize the possibility that the oscillator will oscillate in two modes at the same time, the frequency response of the delay line is arranged so that no more than two modes coexist in the main lobe of the frequency response curve. This is achieved by the topology of the electrodes as well as the distance between the transmitting electrode and the receiving electrode. The gain of the amplifier is also chosen to be at least the absolute value of the greatest loss expected to be encountered at an oscillating frequency within the main lobe but not great enough to allow oscillation in two modes simultaneously.

According to a disclosed preferred embodiment, the surface acoustic wave has a wavelength of approximately 200 microns at 20 MHz. The gap between the substrates of the first and second transducers is as small as possible and preferably is less than 0.1 wavelength, i.e. 10–20 microns. The amplifier preferably has a gain of at least approximately 17 dB in order to guarantee natural oscillation, and preferably not more than approximately 30 dB so that the oscillator oscillates in only one mode at a time. The preferred manner of determining the cycle of the periodic output of the amplifier is to provide a second pair of transducers adjacent to the first pair and coupled to each other in the same type of delay line feedback loop. The second pair of transducers utilize a SAW with a different wavelength than the first pair of transducers, e.g. approximately 220 microns at 18 MHz. The output of the second amplifier is, therefore, a periodic function with a different frequency than the periodic function which is the output of the first amplifier. By combining the outputs of both amplifiers, a unique value is provided for each position of the elastic member.

Typically, the elastic member is chosen so that it will bend up to 150 microns under maximum load. Given the wavelength of the SAW, this results in about two to three modes of oscillation in the output of the first amplifier.

The provided apparatus can theoretically achieve an accuracy on the order of one part in one hundred thousand, e.g. one gram per hundred kilograms. In practice, however, a resolution on the order of one part in fifty thousand is readily achieved. It has been observed by the inventors herein that several factors have varying influence on the accuracy of the SAW system. These factors include reflected waves, temperature changes, and the frequency of the oscillator. Generally, reflected waves result in non-linearity of measurements, and temperature has an effect of about 70 ppm per degree C.

SUMMARY OF THE INVENTION

It is therefore an object of the invention to provide an electronic weighing apparatus which is accurate.

It is also an object of the invention to provide an electronic weighing apparatus which uses surface acoustic waves and is accurate over a broad range of weights.

It is another object of the invention to provide an electronic weighing apparatus which is compact and easy to construct.

It is a further object of the invention to provide an electronic weighing apparatus which is inexpensive to manufacture.

It is another object of the invention to provide an electronic weighing apparatus which utilizes surface acoustic waves and which is provided with means for reducing reflected waves.

It is still another object of the invention to provide an electronic weighing apparatus which maintains accuracy despite temperature gradients within the system.

It is yet another object of the invention to provide an electronic weighing apparatus which utilizes surface acoustic waves at a relatively high frequency.

In accord with these objects which will be discussed in detail below, the improved weighing apparatus of the present invention includes a base which supports a cantilevered elastic member upon which a load platform is mounted. The interior of the elastic member is hollowed and is provided with first and second piezoelectric transducers which are mounted on respective opposed posts. Each transducer includes a substantially rectangular piezoelectric substrate and a pair of electrodes imprinted on the substrate at one end thereof, with one pair of electrodes acting as a transmitter and the other pair of electrodes acting as a receiver. The transducers are arranged with their substrates substantially parallel to each other with a small gap between them and with their respective electrodes in relatively opposite positions. The receiver electrodes of the second transducer are coupled to the input of an amplifier and the output of the amplifier is coupled to the transmitter electrodes of the first transducer. The transducers form a "delay line" and the resulting circuit of the delay line and the amplifier is a positive feedback loop, i.e. a natural oscillator. More particularly, the output of the amplifier causes the first transducer to emit a surface acoustic wave ("SAW") which propagates along the surface of the first transducer substrate away from its electrodes. The propagating waves in the first transducer induce an oscillating electric field in the substrate which in turn induces similar SAW waves on the surface of the second transducer substrate which propagate in the same direction along the surface of the second transducer substrate toward the electrodes of the second transducer. The induced waves in the second transducer cause it to produce an alternating voltage which is supplied by the electrodes of the second transducer to the amplifier input. The circuit acts as a natural oscillator, with the output of the amplifier having a particular frequency which depends on the physical characteristics of the transducers and their distance from each other, as well as the distance between the respective electrodes of the transducers.

According to the invention, when a load is applied to the load platform, the cantilevered elastic member bends and causes the first transducer to move relative to the second transducer. The movement of the first transducer relative to the second transducer causes a change in the frequency at the output of the amplifier. The bending movement of the elastic member is proportional to the weight of the applied load and the frequency and/or change in frequency at the output of the amplifier can be calibrated to the displacement of the elastic member.

According to one aspect of the invention, one or both substrates are provided with anti-reflection structure which may be an angled cut, a rounded end, or a surface damper.

According to a second aspect of the invention, the transducers are arranged on overlapping substrates which allows more room for a damping material to further reduce reflection and allows more room for additional transducers.

According to a third aspect of the invention, the transducers are coupled to a thermal sink to reduce the effects of thermal gradients across the transducers.

According to a fourth aspect of the invention, two pairs of transducers are provided and arranged to move in opposite directions which doubles the readability of measurements and also compensates for the effects of temperature gradients.

According to a fifth aspect of the invention, a thermal transducer channel is provided on the same substrate to measure the effects of temperature and thereby compensate for temperature effects.

According to a sixth aspect of the invention, a pair of differential transducers is arranged to measure the effects of temperature changes in the same acoustic channel in which displacement measurements are made.

According to a seventh aspect of the invention, a phase shift (preferably 180°) is introduced in the oscillator of the delay line, when required, in order for the oscillator to oscillate in the most optimal section of the frequency response curve (near the center) where temperature effects are minimized.

According to an eighth aspect of the invention, two surface dampers are provided for each transducer. This is accomplished in one of two ways. According to one way, a surface mount damper is formed from a thin mylar film. According to the other way, a multistrip coupler is formed by an aluminized pattern of lines behind the transducer and a surface damper is provided behind the multistrip coupler.

According to a ninth aspect of the invention, long term stability is enhanced by sealing the transducer, preferably hermetically, and/or by providing a second hermetically sealed temperature transducer and by using the output of the sealed transducer to correct for the effects of temperature and humidity.

Additional objects and advantages of the invention will become apparent to those skilled in the art upon reference to the detailed description taken in conjunction with the provided figures.

BRIEF DESCRIPTION OF THE DRAWINGS

FIG. 1a is an enlarged schematic plan view of a first transducer;

FIG. 1b is an enlarged schematic plan view of a second transducer;

FIG. 9 is an enlarged schematic side elevation view of a differential transducer system according to the invention, incorporating a split second channel;

FIG. 10 is an enlarged schematic plan view of one pair of transducers of the system of FIG. 9;

FIG. 11 is an enlarged schematic plan view of the other pair of transducers of the system of FIG. 9;

FIG. 12 is an enlarged schematic plan view of the first part of a differential transducer system having two pair of separate thermal transducer channels;

FIG. 13 is an enlarged schematic plan view of the second part of a differential transducer system having two pair of separate thermal transducer channels;

FIG. 14 is a schematic transparent view of the transducers of FIGS. 12 and 13 in an operative alignment;

DETAILED DESCRIPTION OF THE PREFERRED EMBODIMENTS

Figure 1:
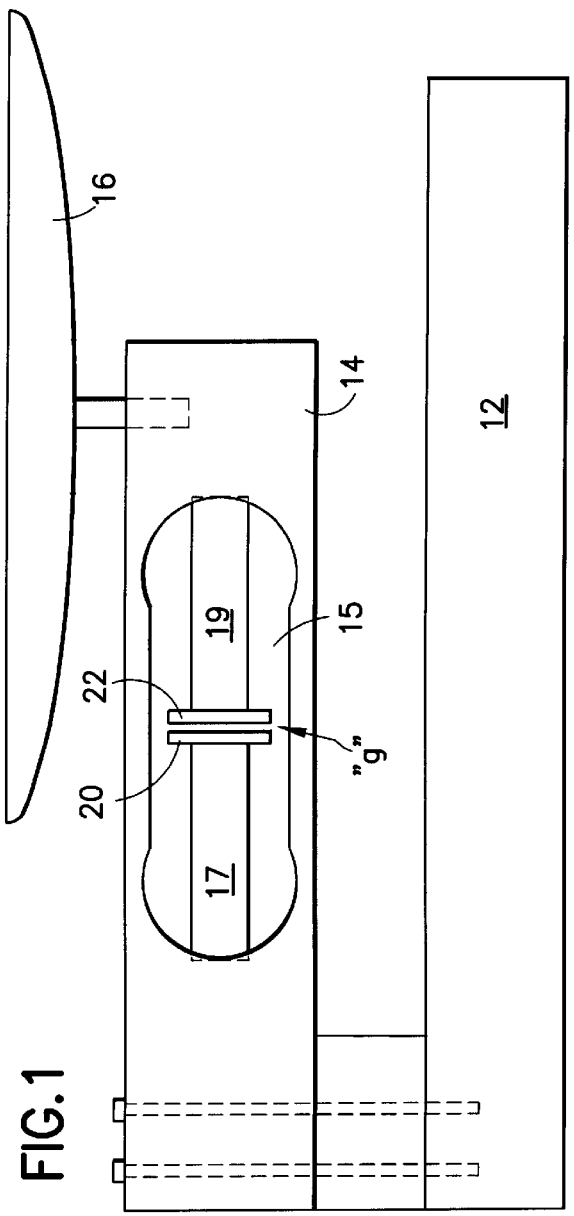
FIG. 1 is a schematic side elevation view of an exemplary embodiment of the invention.

Referring now to FIGS. 1, 1a, and 1b, an electronic weighing apparatus 10 according to the invention includes a base 12 which supports a cantilevered elastic member 14 having a cut-out 15, and upon which a load platform 16 is mounted. The cut-out 15 is provided with two opposed posts 17, 19 upon which are respectively mounted a first piezoelectric transducer 20 and a second piezoelectric transducer 22. The posts 17, 19 serve to locate the transducers 20, 22 at the center of the elastic member 14 and to mechanically couple the transducers to opposite ends of the elastic member 14.

The first transducer 20 includes a substantially rectangular piezoelectric substrate 20a and a pair of electrodes 20b imprinted on the substrate at the upper end thereof. The second transducer 22 includes a substantially rectangular piezoelectric substrate 22a and a pair of electrodes 22b imprinted on the substrate at the lower end thereof. The substrates are preferably made of Lithium Niobate. The transducers are arranged with their substrates substantially parallel to each other with a small gap "g" between them. The electrodes 22b of the second transducer 22 are coupled to the input of an amplifier (not shown) powered by a power source (not shown) and the output of the amplifier is coupled to the electrodes 20b of the first transducer 20. The circuit arrangement is the same as shown in the parent application Ser. No. 08/489,365, previously incorporated herein by reference. The resulting circuit is a positive feedback loop natural oscillator, a "delay line". The output of the amplifier generates an alternating voltage in the electrodes 20b of the first transducer 20 which generates a surface acoustic wave ("SAW") 26 which propagates along the surface of the first transducer substrate 20a away from its electrodes 20b. Since the substrate 20a of the first transducer 20 is relatively close to the substrate 22a of the second transducer 22, an oscillating electric field which is induced as a result of the SAW waves 26 in the piezoelectric substrate 20a is able to in turn induce similar SAW waves 28 on the surface of the second transducer substrate 22a which propagate in the same direction along the surface of the second transducer substrate toward the electrodes 22b of the second transducer 22. The induced waves 28 in the second transducer 22 cause the electrode 22b of the second transducer 22 to produce an alternating voltage which is provided to the input of the amplifier. As long as the gain of the amplifier 24 is larger than the loss of the system, the circuit acts as a natural oscillator with the output of the amplifier having a particular frequency which depends on the physical characteristics of the transducers and their distance from each other, as well as the distance between the respective electrodes of the transducers. In particular, the frequency of the oscillator is directly related to the time it takes for the SAW to propagate from the electrodes 20b to the electrodes 22b.

According to presently preferred embodiments of the invention, described in more detail below, the SAW 26 has a wavelength of approximately 100–200 microns at 20–50 MHz. In order to limit loss in the system, the gap "g" between the substrates of the first and second transducers is as small as possible and preferably no more than 0.1 wavelength. In one preferred embodiment described below, the gap is 5–10 microns. With such a gap, an oscillating system can typically be generated if the amplifier 24 has a gain of at least approximately 17 dB. It will be appreciated that when a load (not shown) is applied to the load platform 16, the free end of the cantilevered elastic member 14 moves down and causes the second transducer 22 to move relative to the first transducer 20. In particular, it causes the electrodes 22b of the second transducer 22 to move away from the electrodes 20b of the first transducer 20. This results in a lengthening of the "delay line". The lengthening of the delay line causes an decrease in the frequency at the output of the amplifier. The displacement of the elastic member is proportional to the weight of the applied load and the frequency or decrease in frequency at the output of the amplifier can be calibrated to the distance moved by the elastic member.

It will be appreciated that locating the transducers at the center of the elastic member compensates for any torque on the member which would exhibit itself at the free end of the member. This results in an improved accuracy as compared to the weighing instrument of the parent application. Depending on the application (e.g. maximum load to be weighed), the elastic member is made of aluminum or steel. The presently preferred elastic member exhibits a maximum displacement of 0.1 to 0.2 mm at maximum load.

Figure 2:
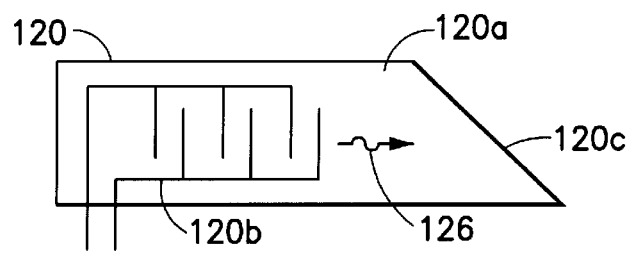
FIG. 2 is an enlarged schematic plan view of a transducer having a first anti-reflection structure according to the invention.
Figure 3:
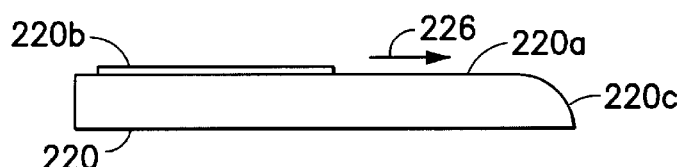
FIG. 3 is an enlarged schematic side elevation view of a transducer having a second anti-reflection structure according to the invention.
Figure 4:
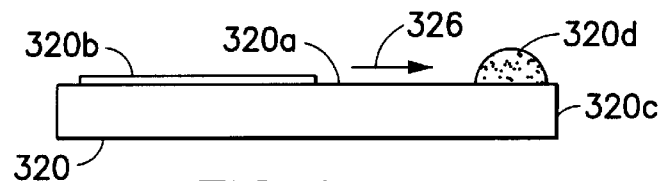
FIG. 4 is an enlarged schematic side elevation view of a transducer having a third anti-reflection structure according to the invention.

It has been recognized by the inventors that reflected waves may occur on the substrate of the transmitting transducer which interfere with SAW wave generation and result in non-linearity of measurements. More particularly, when the wave 26 propagates along the substrate 20a, it reaches the end 20c of the substrate and a portion of the wave is reflected back 180° toward the electrodes 20b. The reflected wave interferes with the propagated wave 26. In fact, a portion of the reflected wave is again reflected off the other end 20d of the substrate 20a causing additional interference. Reflected waves can also be a problem in the receiving transducer. FIGS. 2–4 show several anti-reflection structures according to the invention.

Turning now to FIG. 2, a transducer 120 according to the invention includes a piezoelectric substrate 120a and a pair of electrodes 120b for generating a SAW wave 126. According to the invention, the end 120c of the substrate 120a is cut at an angle relative to the propagation path of the SAW wave 126. Thus, when the wave 126 reaches the end 120c of the substrate, any reflection of the wave is at an angle relative to the line of propagation so that the reflected wave does not interfere with the propagated wave.

Turning now to FIG. 3, a transducer 220 according to the invention includes a piezoelectric substrate 220a and a pair of electrodes 220b for generating a SAW wave 226. According to the invention, the end 220c of the substrate 220a is rounded (e.g., by sandblasting) relative to the propagation path of the SAW wave 226. Thus, when the wave 226 reaches the end 220c of the substrate it is scattered rather than reflected back.

Turning now to FIG. 4, a transducer 320 according to the invention includes a piezoelectric substrate 320a and a pair of electrodes 320b for generating a SAW wave 326. According to the invention, a damper such as a soft elastomeric 320d is placed on the surface of the substrate adjacent the end 320c. Thus, when the wave 326 reaches the damper 320d, it is absorbed by the damper rather than reflected back.

Figure 5:
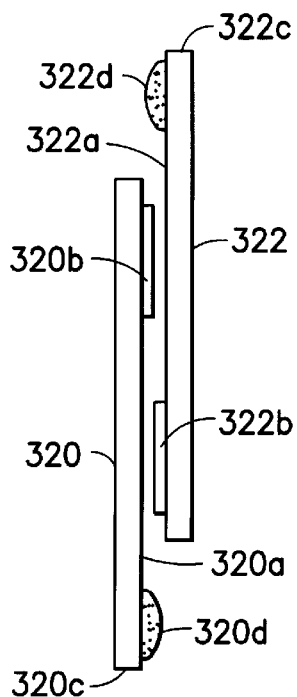
FIG. 5 is an enlarged schematic side elevation view of an overlapping transducer system having anti-reflection structure according to the invention.

Of the different anti-reflection structure described above, the damper material shown in FIG. 4 appears to be the presently preferred structure. Accordingly, as shown in FIG. 5, a pair of transducers 320, 322 are provided with damper material 320d, 322d adjacent ends 320c, 322c opposite electrodes 320b, 322b on the respective substrates 320a, 322a. The transducers 320, 322 are advantageously arranged in an overlapping manner as shown in FIG. 5.

As mentioned above, in addition to problems associated with reflected waves, changes in temperature adversely affect the accuracy the weighing apparatus. It is known from the parent application that overall changes in ambient temperature may be compensated for by including a temperature sensor in the weighing apparatus and using a look-up table for appropriate temperature corrections. However, in addition to overall changes in ambient temperature, it has been discovered that temperature gradients can occur across the substrates of the transducers. More particularly, it has been discovered that the lithium niobate substrates have a temperature effect of about 70 ppm per degree C. In a 20 Mhz system, this results in a change of 1.4 Khz per degree. In order to obtain the desired accuracy, the temperature difference between the transducers should be less than 0.01 degrees C. At 20 Mhz, the full scale output for one mode is about 200 Khz. Since the substrate shows a temperature effect of 1.4 Khz per degree C., this results in a 0.7% variation of the full scale per degree C. In order to maintain an accuracy of within 0.007% of the full scale, therefore, the temperature difference should be less than 0.01 degree C.

Several aspects of the present invention combine to help overcome the effects of temperature on the accuracy of the weighing apparatus. Some of these aspects also enhance the overall accuracy of the apparatus regardless of temperature effects.

Figure 8:
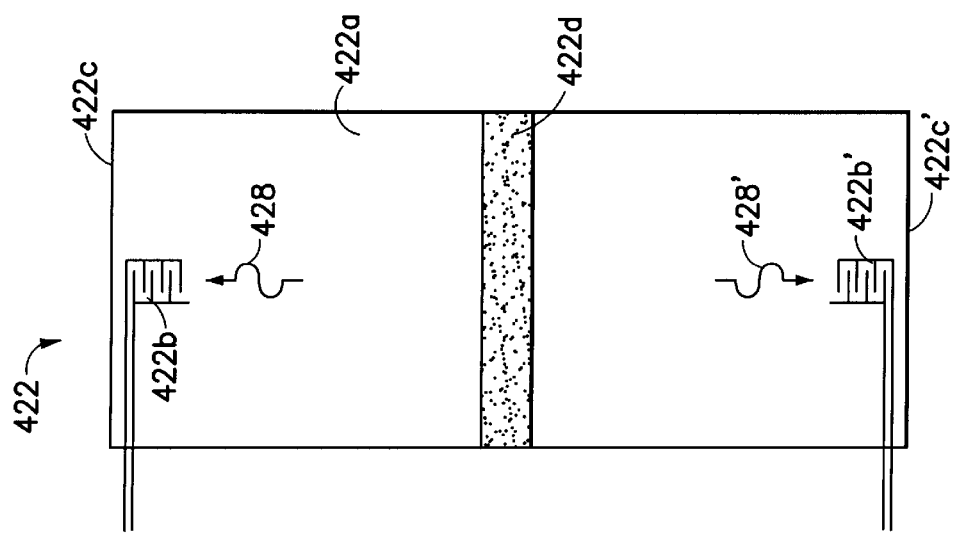
FIG. 8 is an enlarged schematic plan view of the other pair of transducers of the system of FIG. 6.
Figure 7:
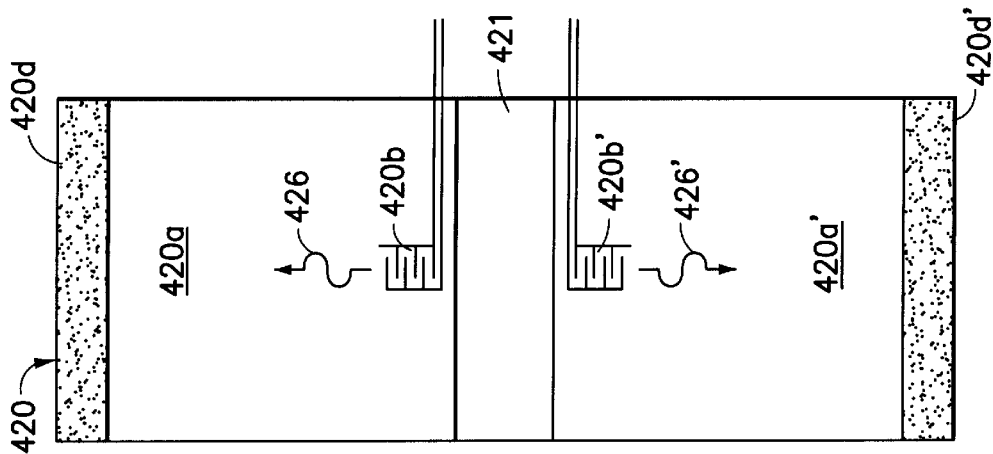
FIG. 7 is an enlarged schematic plan view of one pair of transducers of the system of FIG. 6.
Figure 6:
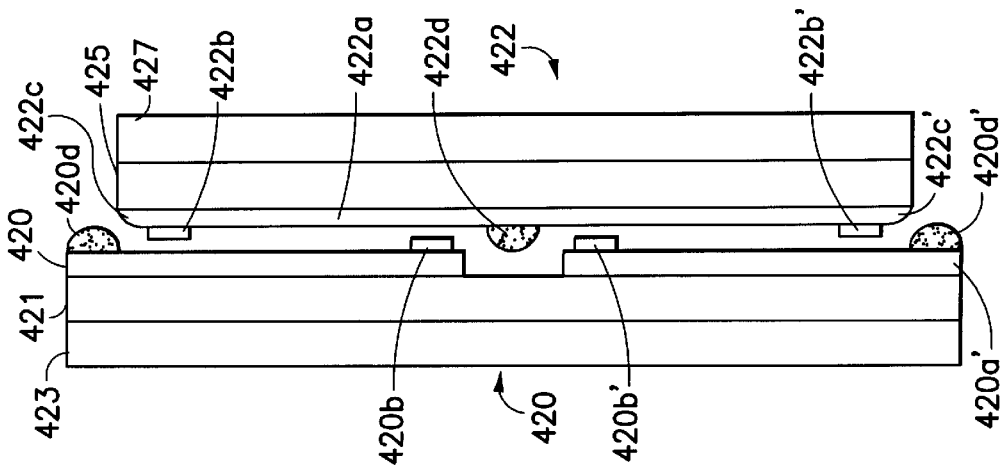
FIG. 6 is an enlarged schematic side elevation view of an overlapping differential transducer system according to the invention, incorporating anti-reflection structure and thermal sinks.

FIGS. 6–8 show a pair of transducers 420, 422 according to the invention which embody several aspects of the invention. Referring now to FIGS. 6–8, the transducer system includes a transmitting transducer 420 and a receiving transducer 422. The transmitting transducer 420 includes two piezoelectric substrates 420a, 420a' which are mounted on one side a thermal sink 421, and a thermal insulator 423 is mounted on the other side of the thermal sink 421. The thermal sink 421 helps to maintain a constant temperature across both substrates 420a, 420a' and the thermal insulator 423 helps to prevent ambient temperature changes from affecting the temperature of the thermal sink 421 and thus the substrates 420a, 420a'. Each substrate 420a, 420a' has a pair of electrodes 420b, 420b' at one end thereof and a surface damper 420d, 420d' at the other end thereof. The substrates are arranged on the thermal sink so that their respective electrode pairs are close to each other and adjacent to the center of the transducer as seen best in FIGS. 6 and 7. The transmitting transducer 420, therefore generates two SAW waves 426, 426' which propagate in opposite directions from the approximate center of the transducer 420. The dampers 420d, 420d' serve to inhibit reflections of the SAW waves 426, 426'.

The receiving transducer 422 includes a piezoelectric substrate 422a which is mounted on one side of a thermal sink 425, and a thermal insulator 427 is mounted on the other side of the thermal sink 425. The thermal sink 425 helps to maintain a constant temperature across the substrate 422a and the thermal insulator 427 helps to prevent ambient temperature changes from affecting the temperature of the thermal sink 425 and thus the substrate 422a. The substrate 422a has two pairs of electrodes 422b, 422b', each pair being located approximately at opposite rounded ends 422c, 422c' of the substrate 422a, and a surface damper 422d is located approximately at the center of the substrate 422a. The receiving transducer 422, therefore receives two SAW waves 428, 428' which are induced respectively by the transmitted SAW waves 426, 426', and which propagate in opposite directions.

The electrode pairs 420b and 422b are coupled to one amplifier to form one delay line oscillator and the electrode pairs 420b' and 422b' are coupled to a second amplifier to form a second delay line oscillator. From the foregoing, it will be appreciated that when the transducers 420, 422 move relative to each other as described above with reference to FIG. 1, one of the delay line oscillators will increase in frequency and the other delay line oscillator will decrease in frequency by an equal amount. This "differential" transducer system provides several benefits. The effects of ambient temperature are automatically accounted for and the resolution of the displacement measurement is doubled.

For example, if the frequency of a delay line oscillator is $f_0$ at a predefined temperature, the frequency after a change in ambient temperature can be expressed as $f=f_0(1+k\Delta t)$, where k is a constant and $\Delta t$ is the change in ambient temperature. Similarly, if the frequency of a delay line oscillator is $f_0$ when no load is placed on the weighing apparatus, the frequency after the transmitter and receiver have been displaced by a load can be expressed as $f=f_0(1\pm g\Delta x)$, where g is a constant and $\Delta x$ is the displacement (positive or negative) due to a particular load. The combined change in frequency $\Delta f$ due to temperature and displacement, therefore equals $f_0(k\Delta t \pm g\Delta x)$.

Given the foregoing, it will be appreciated that the combined effects of temperature and displacement on the frequency of the delay line oscillators of FIGS. 6–8 can be expressed by the equations indicated below at (1) and (2) where f1 is the frequency of the oscillator which includes electrodes 420b, 422b and f2 is the frequency of the oscillator which includes electrodes 420b', 422b'.

$$\Delta f1 = f1_0 k\Delta t + f1_0 g\Delta x \quad (1)$$

$$\Delta f2 = f2_0 k\Delta t - f2_0 g\Delta x \quad (2)$$

The quantities $\Delta f1$, $\Delta f2$, $f1_0$, and $f2_0$, will therefore be known during any weight measurement and may be subjected to the cross product expressed below at (3).

$$(\Delta f1 \times f2_0) - (\Delta f2 \times f1_0) \quad (3)$$

By substituting equations (1) and (2) in expression (3), the expression listed below at (4) is obtained.

$$f2_0 f1_0 k\Delta t + f2_0 f1_0 g\Delta x - f1_0 f2_0 k\Delta t + f1_0 f2_0 g\Delta x \quad (4)$$

By combining terms, it will be appreciated that the effects of temperature will be canceled out of expression (4) and that expressions (3) and (4) can be expressed as the simplified equation listed below at (5).

$$(\Delta f1 \times f2_0) - (\Delta f2 \times f1_0) = 2f1_0 f2_0 g\Delta x \quad (5)$$

It will therefore be appreciated that the differential transducer system described above, not only eliminates the affects of ambient temperature change from the weighing measurement, but also provides double the resolution scale of a single transducer system. Nevertheless, the system described with reference to FIGS. 6–8 will not automatically compensate for temperature gradients across the substrates of the transducer and that is why the transducer system is provided with the thermal sinks described above. It will also be appreciated that the overall length (height) of the transducer system is substantially doubled as compared with the non-differential system. In order to reduce the overall size of the transducer system and to increase the sensitivity and resolution of the system, the present invention preferably uses a frequency of approximately 50 mhz as compared to the 20 mhz frequency of the parent application. At this frequency, in order to achieve the desired accuracy (0.5 grams per 10 kg), the temperature difference between the substrates must be kept below 0.01 degrees C°.

FIGS. 9–11 show a schematic illustration of a differential transducer system similar to the one described above, but with both transducer channels operating on the same substrate and with one of the transducer channels being split. Referring now to FIGS. 9–11, the transducer system includes a transmitting transducer 520 and a receiving transducer 522. The transmitting transducer 520 includes a piezoelectric substrate 520a which is mounted on one side a thermal sink 521, and a thermal insulator 523 is mounted on the other side of the thermal sink 521. The thermal sink 521 helps to maintain a constant temperature across the substrate 520a and the thermal insulator 523 helps to prevent ambient temperature changes from affecting the temperature of the thermal sink 521 and thus the substrate 520a. A first transmitting electrode 520b is located at one end of the substrate 520a on a central axis thereof. A second transmitting electrode pair 520c, 520d is located at the other end of the substrate on opposite sides of the central axis. Each of the electrodes 520c, 520d is approximately half the wavelength of the electrode 520b and the electrodes 520c, 520d are coupled in parallel to form the electrode pair. The transmitting transducer 520, therefore generates three SAW waves 526, 526', and 526''. The first SAW wave 526 propagates along a central channel on the substrate and in a first direction. The second and third SAW waves 526' and 526'' propagate along two side channels on the substrate an in a direction opposite to the first SAW wave.

The receiving transducer 522 includes a piezoelectric substrate 522a which is mounted on one side of a thermal sink 525, and a thermal insulator 527 is mounted on the other side of the thermal sink 525. The thermal sink 525 helps to maintain a constant temperature across the substrate 522a and the thermal insulator 527 helps to prevent ambient temperature changes from affecting the temperature of the thermal sink 525 and thus the substrate 522a. The substrate 522a has a first receiving electrode 522b and a second receiving electrode pair 522c, 522d. The receiving electrode 522b is at one end of the substrate on a central axis thereof and the receiving electrodes 522c, 522d are located at the other end of the substrate on opposite sides of the central axis. The receiving electrodes 522c, 522d are half the wavelength of the electrode 522b and are coupled in parallel to each other. The receiving transducer 522, therefore receives three SAW waves 528, 528', and 528" which are induced respectively by the transmitted SAW waves 526, 526', 526".

The arrangement shown in FIGS. 9–11 has several advantages. The SAW wave propagation channels are closer together on the same substrate and therefore the temperature gradient between them will be smaller. The overall size of the transducer system is smaller. In addition, the transducers are axially symmetrical which enhances mechanical performance.

FIGS. 12–14 show a schematic illustration of a differential transducer system similar to the one described above, but with additional electronic means for measuring the temperature of the substrates. Referring now to FIGS. 12–14, a transmitting transducer 620 includes a first piezoelectric substrate 620a and a second piezoelectric substrate 620a', both of which are mounted on a base 623 which is preferably constructed as a sandwich of insulating and conductive materials as described above with reference to FIG. 6. The first piezoelectric substrate 620a is provided with a first pair of transmitting electrodes 620b at a lower central portion thereof and the second piezoelectric substrate 620a' is provided with a second pair of transmitting electrodes 620b' at an upper central portion thereof. In addition, first piezoelectric substrate 620a is provided with two pair of electrodes 630a, 630b which are spaced apart from each other and arranged off center from the first pair of transmitting electrodes 620b. The electrodes 630a, 630b are respectively a transmitter and receiver which are used to measure the temperature of the substrate 620a as described below. Accordingly the substrate 620a' is also provided with two pair of temperature measuring electrodes 630a', 630b'.

A receiving transducer 622 includes a first piezoelectric substrate 622a and a second piezoelectric substrate 622a', both of which are mounted on a base 627 which is preferably constructed as a sandwich of insulating and conductive materials as described above with reference to FIG. 6. The first piezoelectric substrate 622a is provided with a first pair of receiving electrodes 622b at an upper central portion thereof and the second piezoelectric substrate 622a' is provided with a second pair of transmitting electrodes 622b' at a lower central portion thereof. In addition, the first piezoelectric substrate 622a is provided with two pair of temperature measuring electrodes 632a, 632b which are spaced apart from each other and arranged off center from the first pair of transmitting electrodes 522b. The substrate 522a' is also provided with two pair of temperature measuring electrodes 632a', 632b'.

The transducer arrangement shown in FIGS. 12–14 incorporates several of the features of the transducer arrangement described above with reference to FIGS. 6–8. The electrode pairs 620b, 620b', 622b, 622b' are arranged to provide a differential displacement measurement system as described above. In this regard, and with reference to FIG. 14, it will be appreciated that the differential system utilizes two acoustic channels which are centrally located, one on the upper pair of substrates and the other on the lower pair of substrates. In addition, it will be appreciated that the transmitting substrates are slightly larger than the receiving substrates and therefore overlap the receiving substrates with the same advantages as described above. According to a presently preferred embodiment, the transmitting transducer 620 is approximately 45 mm long and the space between the first and second substrates is approximately 5 μm. The receiving transducer 622 is approximately 10 mm shorter than the transmitting transducer and the space between the first and second receiving substrates is approximately 5 μm.

As mentioned above, each of the four piezoelectric substrates is provided with a two pair of temperature measuring electrodes which are arranged as a fixed position delay line on each substrate. Each of the four sets of temperature measuring electrodes is coupled to a respective amplifier and thereby forms a natural oscillator which preferably oscillates at a frequency which is different from the frequency at which the displacement measuring oscillators oscillate. Since the temperature measuring electrode sets are stationary on their respective substrates, the frequency of their respective oscillators will vary only due to changes in temperature. With this provided arrangement, the temperature of each of the four substrates can be determined and accounted for when making displacement and weight measurements.

Figure 17:
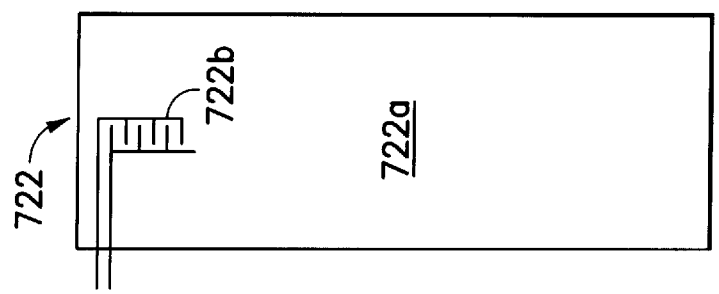
FIG. 17 is an enlarged schematic plan view of the second part of the transducer system of FIG. 15.
Figure 16:
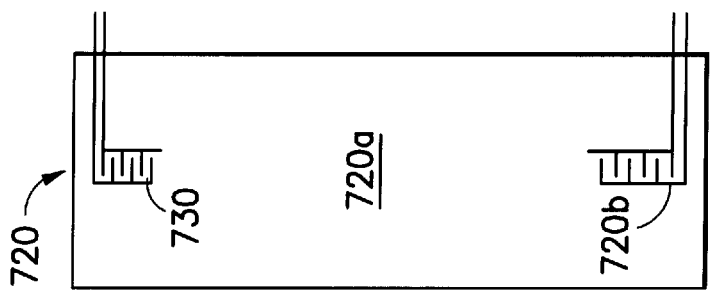
FIG. 16 is an enlarged schematic plan view of the first part of the transducer system of FIG. 15.
Figure 15:
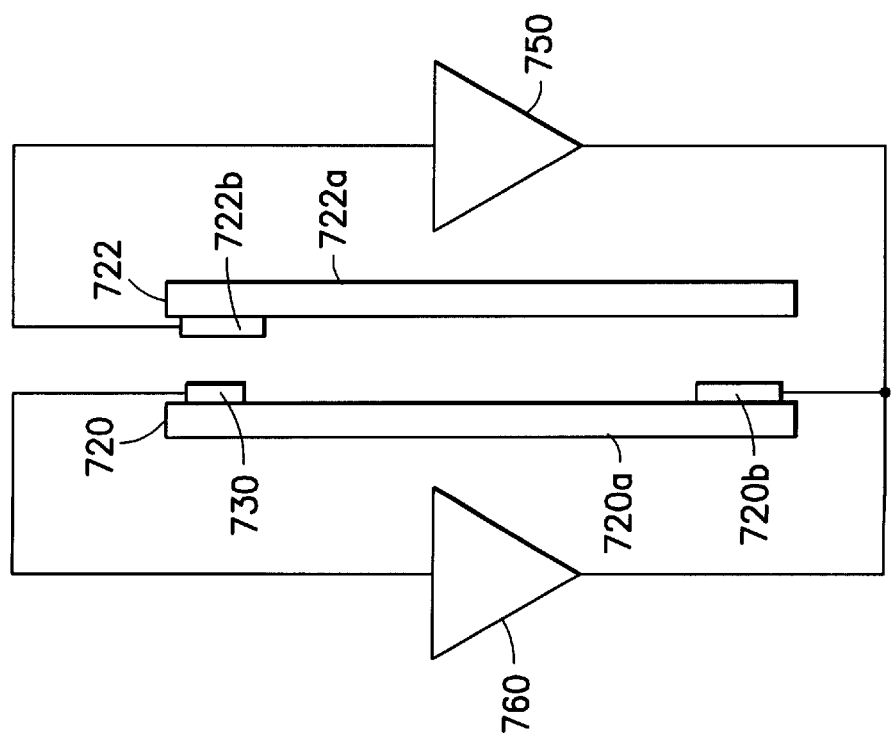
FIG. 15 is an enlarged schematic side elevation view of a transducer system having a thermal transducer located in the same acoustic channel as the displacement transducers and an example of a circuit for the same.

As seen in FIG. 14, each of the two measuring electrode sets operates in a separate acoustic channel. It is possible, however, to provide two measuring electrode sets which operate in almost the same channel. This minimizes the thermal gradient between the two channels. FIGS. 15–17 illustrate one embodiment of such an arrangement.

Turning now to FIGS. 15–17, a transmitting transducer 720 includes a piezoelectric substrate 720a with a pair of transmitting electrodes 720b located at a lower end thereof and a pair of receiving electrodes 730 located at an upper end thereof. A receiving transducer 722 includes a piezoelectric substrate 722a with a pair of receiving electrodes 722b at an upper end thereof. It will be appreciated that the transmitting and receiving electrodes 720b, 722b are arranged with amplifier 750 to form a delay line for measuring displacement and weight as described above. In addition, the receiving electrodes 730 on the transmitting substrate form a stationary delay line with amplifier 760 and the transmitting electrodes 720b for measuring the temperature of the transmitting substrate 720a. The amplifiers 750 and 760 may be operated simultaneously if the delay lines have significantly different frequencies. Alternatively, the amplifiers 750, 760 may be switched on and off alternatingly. It will be appreciated that all of the electrodes operate in the same acoustic channel. The transducer system shown in FIGS. 15–17 is a non-differential system wherein the temperature of the transmitting substrate is assumed to be close to that of the receiving substrate. However, it is possible to apply the technology of this system to a differential system wherein separate measurements are made for the two channels. Such a system is shown in FIGS. 18–20.

Figure 20:
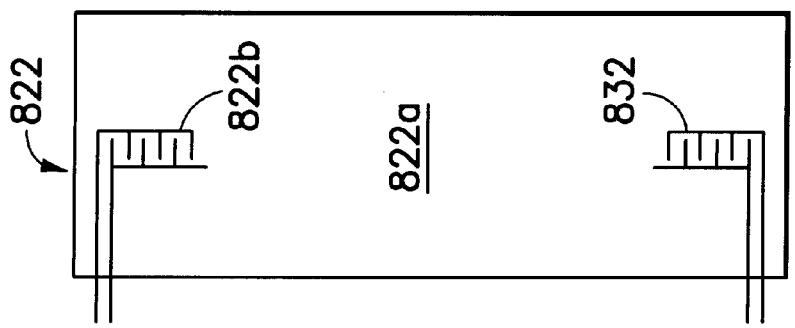
FIG. 20 is an enlarged schematic plan view of the second part of the transducer system of FIG. 18.
Figure 19:
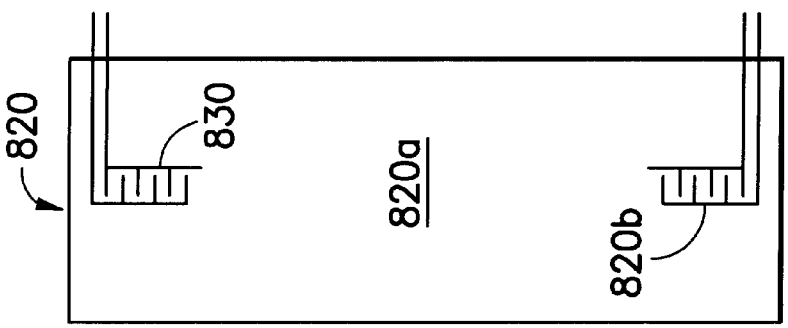
FIG. 19 is an enlarged schematic plan view of the first part of the transducer system of FIG. 18.
Figure 18:
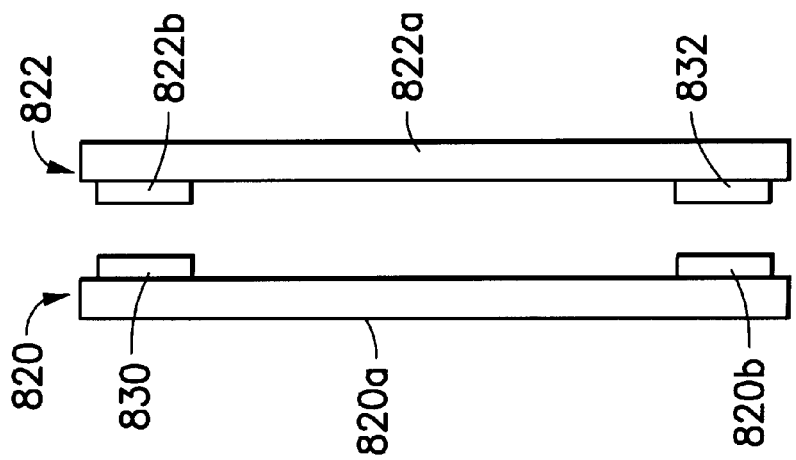
FIG. 18 is an enlarged schematic side elevation view of a differential transducer system having two transducers sharing the same acoustic channel.

Turning now to FIGS. 18–20, a transmitting transducer 820 includes a piezoelectric substrate 820a with a pair of transmitting electrodes 820b located at a lower end thereof and a pair of transceiving electrodes 830 located at an upper end thereof. A receiving transducer 822 includes a piezoelectric substrate 822a with a pair of receiving electrodes 822b at an upper end thereof and a pair of transceiving electrodes 832 at a lower end thereof. It will be appreciated that the transmitting and receiving electrodes 820b, 822b are arranged to form a delay line for measuring displacement and weight as described above. In addition, the transceiving electrodes 830 and 832 can be used to form a stationary delay line with respective electrodes 820b, 822b or may be used with each other to form a displacement measuring delay line which is differential to the delay line formed by electrodes 820b, 822b. In operation, the four electrode pairs may be multiplexed such that at one moment, two differential displacement measuring delay lines are activated and at another moment two stationary temperature measuring delay lines are activated. In this manner, the temperature of each substrate can be ascertained prior to or even during temperature measurement. It will be appreciated that all of the electrodes operate in the same acoustic channel.

As mentioned above and in the parent application, the delay lines according to the invention may oscillate in more than one mode and within each mode, the gain will vary as the frequency changes. According to the invention, the phase of the oscillator may be shifted ±180° in order to increase gain (decrease loss). FIGS. 21–26 illustrate how the modes of oscillation change during weighing and how phase shifting can be used to increase gain.

Figure 21:
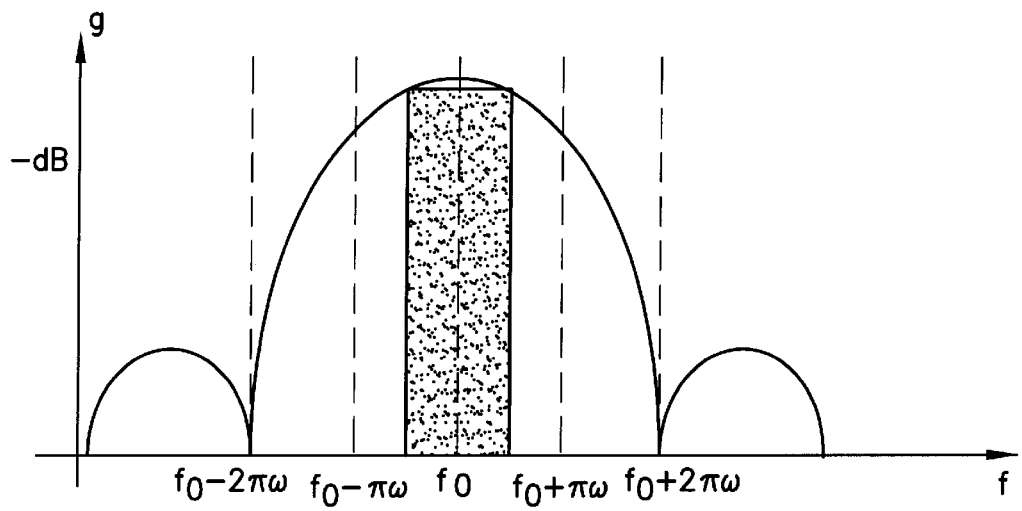
FIGS. 21–26 are a graphs of a portion of a frequency response curve for a delay line according to the invention showing modes of oscillation and phase shifting according to the invention.

Referring now to FIG. 21, in the idle state, with no weight applied to the scale, the delay line will oscillate at a frequency "$f_0$" which is shown in FIG. 21 as the point having the most gain (least loss). The optimal gain area of the graph of FIG. 21 is shown in the shaded area surrounding $f_0$ and represents a range of ±100 Khz, for example. This area is considered optimal not only because it is the area of least loss, but because it is the area wherein the curve exhibits the least "non-linearity" and is least influenced by temperature. As described in detail in the parent application, the delay line may oscillate in any of several modes and the modes are separated from each other by a phase difference of $2\pi$. In the example shown in FIG. 21, the frequency $f_0$ has a lower mode $f_0-2\pi\omega$ and a higher mode $f_0+2\pi\omega$, where $\omega$ is the interger one, the phase difference between the modes representing approximately 340 Khz in this example. As weight is added to the scale, the delay line will oscillate at a higher frequency "$f_0+n$". For example, after adding a relatively small weight, the frequency of oscillation will rise to $f_0+70$ Khz which is shown in FIG. 22 as $f_1$.

Figure 22:
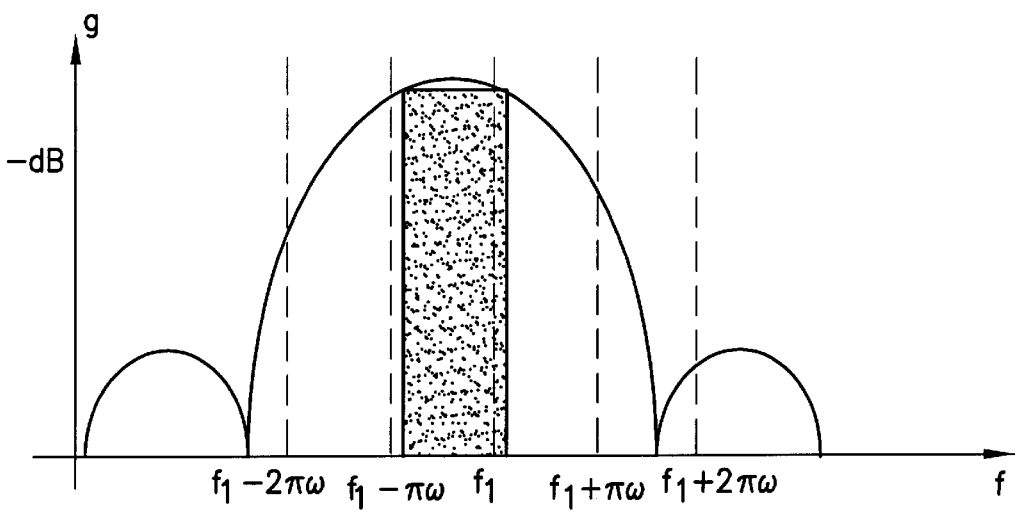

Referring now to FIG. 22, it will be seen that the new frequency of oscillation $f_1$ is still within the optimal gain area and the higher and lower modes of oscillation have greater loss than the mode at $f_1$. It will be appreciated, however, that with the addition of additional weight, the frequency f will soon pass out of the optimal gain area. For example, an additional weight could shift the frequency an additional 50 Khz to the position shown in FIG. 23.

Figure 23:
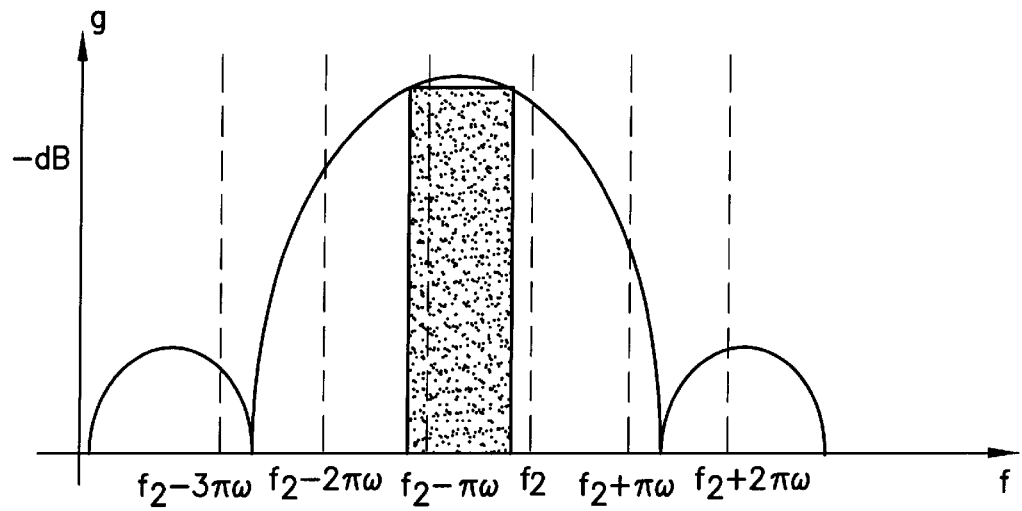

Referring now to FIG. 23, an oscillation frequency $f_2$ which is approximately 120 Khz higher than $f_0$, would move the frequency out of the optimal gain area. Nevertheless, as shown in FIG. 23, the higher and lower modes of oscillation would still show greater loss than the central mode at $f_2$. Those skilled in the art will therefore appreciate that from this point onward, additional weight will raise the frequency of oscillation though an increasingly high loss area until the lower mode achieves greater gain than the central mode which is shown in FIG. 24.

Figure 24:
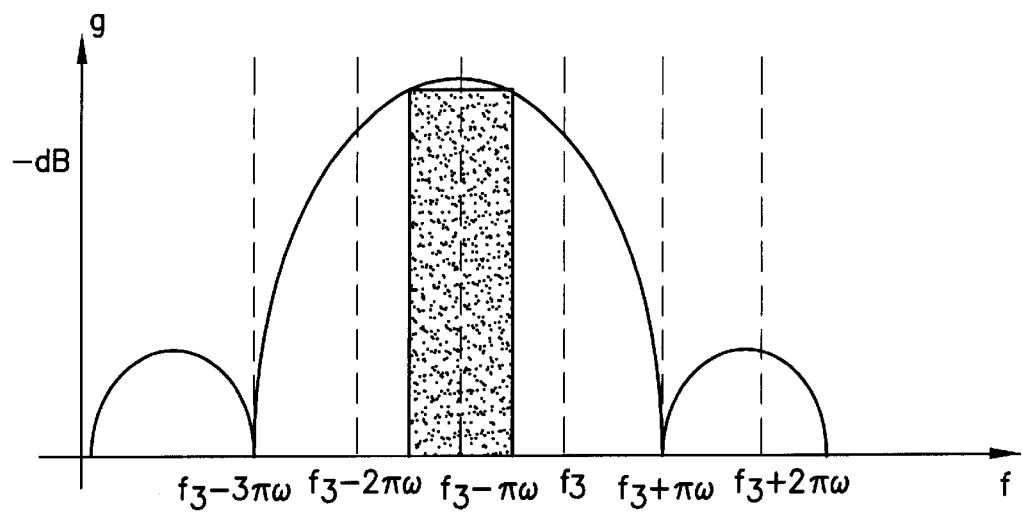

Turning now to FIG. 24, an oscillation frequency $f_3$, which is approximately 170 Khz higher than $f_0$ would cause a shift to the lower mode of oscillation $f_3-2\pi\omega$. It will be appreciated, however, that even after the mode shift, the frequency of oscillation must shift through approximately 70 Khz more before oscillation of the lower mode will occur in the optimal gain area. According to the invention, therefore, it is possible to apply a phase shift of $\pi\omega$ to the oscillator in order to force early oscillation in the optimal gain area. For example, as shown in FIGS. 23 and 24 as soon as the oscillation frequency $f_2$ exhibits loss which indicates it is no longer in the optimal gain area, a phase shift of $-\pi\omega$ is applied. This causes the oscillator (delay line) to oscillate at $f_2-\pi\omega$ which, as can be seen in FIG. 23, is within the optimal gain area of the frequency response curve. This phase shift will maintain the frequency of oscillation $f_3-\pi\omega$ within the optimal area even when the frequency rises to $f_3$ as shown in FIG. 24. Eventually, however, additional weight on the scale will raise the frequency of oscillation to a point where the phase shifted frequency is outside the optimal gain area.

Figure 25:
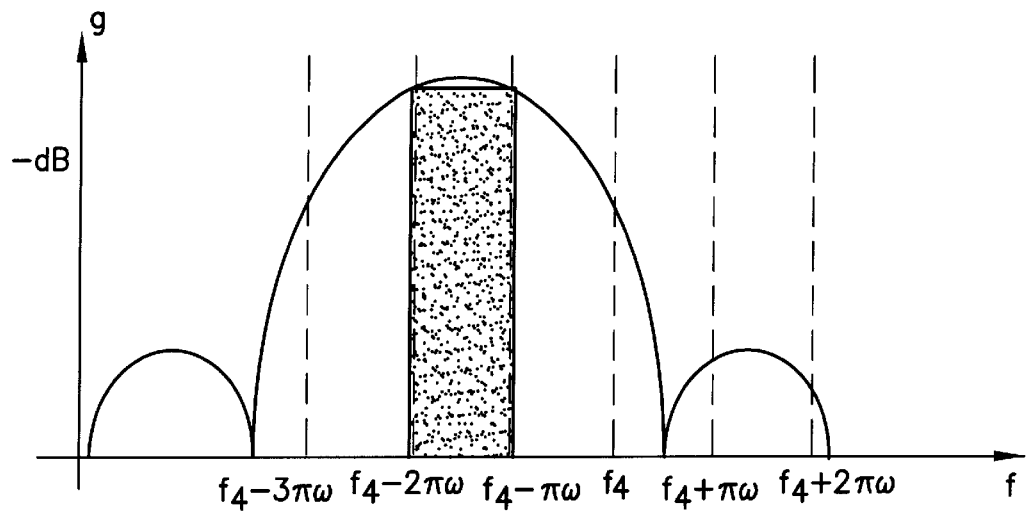

For example, as shown in FIG. 25, when the frequency of oscillation $f_4$ is increased to approximately $f_0+255$ Khz, the phase shifted central mode of oscillation $f_4-\pi\omega$ will exit the optimal gain area. At this point, according to the invention, the $-\pi\omega$ phase shift is discontinued and the oscillator will oscillate in its lower mode $f_4-2\pi\omega$ which is within the optimal gain area. If additional weight is added to the scale, the frequency of oscillation will continue to rise until the lower mode of oscillation passes beyond the optimal gain area as shown in FIG. 26.

Figure 26:
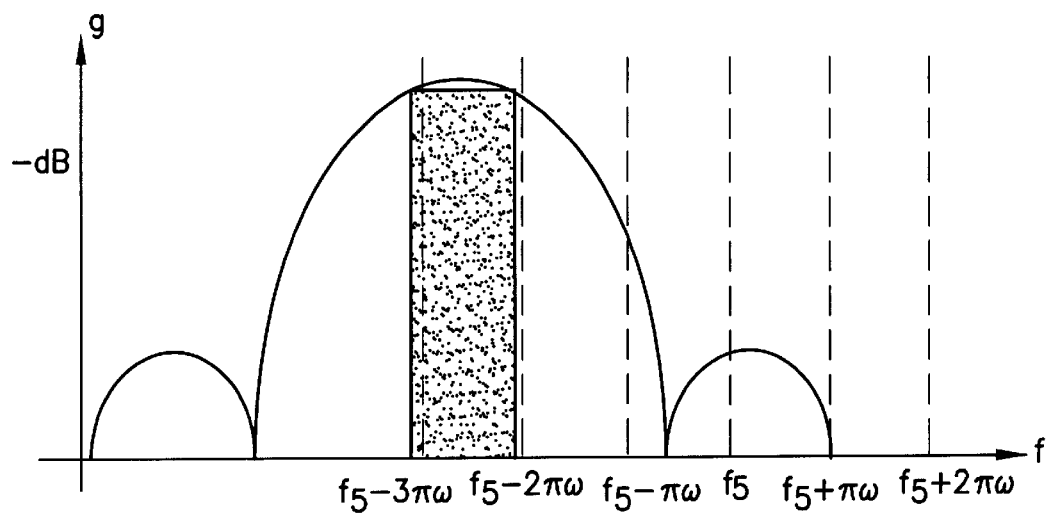

Referring now to FIG. 26, if the frequency $f_5$ is raised to approximately $f_0+400$ Hhz, the lower mode oscillation $f_5-2\pi\omega$ will pass beyond the optimal gain area. According to the invention, at this point, a $-\pi\omega$ phase shift will be applied to the oscillator. This will cause the lower mode of oscillation to reside at $f_5-3\pi\omega$ which is within the optimal gain area.

Figure 27:
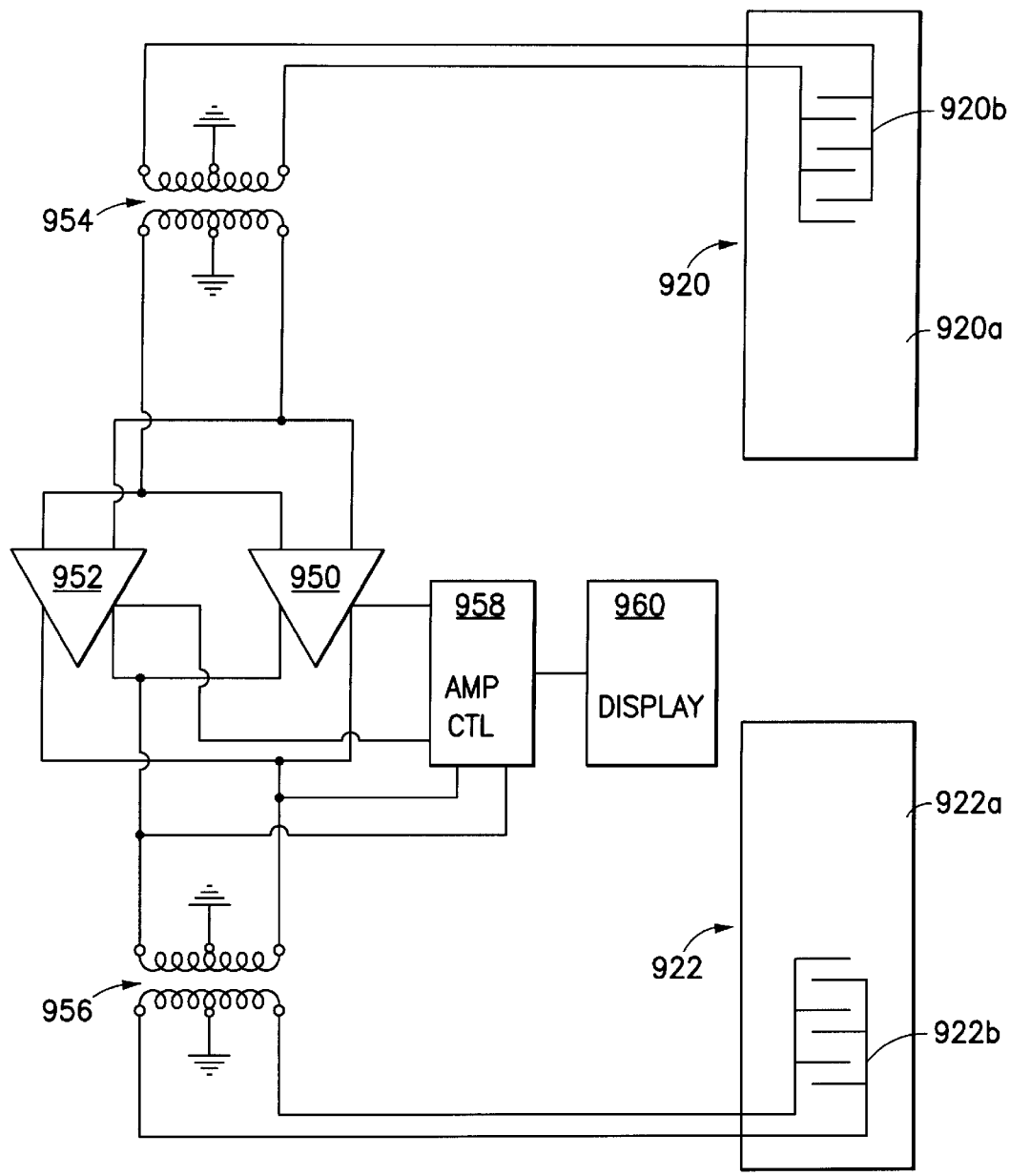
FIG. 27 is a schematic diagram of a positive feedback loop with phase shifting according to the inventions

FIG. 27 shows a simplified schematic diagram of a positive feedback loop with phase shifting according to the invention. Referring now to FIG. 27, a simplified delay loop according to the invention includes a first transducer 920, a second transducer 922, a first differential amplifier 950, a second differential amplifier 952, a pair of matching transformers 954, 956, a frequency counter and amplifier controller 958, and an output processor and weight display 960. The first transducer 920 includes a piezoelectric substrate 920*a* and electrodes 920*b*. The second transducer 922 includes a piezoelectric substrate 922*a* and electrodes 922*b*. The electrodes 920*b* are coupled via the matching transformer 954 to the inputs of the differential amplifiers 950, 952 in a parallel manner. The electrodes 922*b* are coupled to the outputs of the amplifiers 950, 952 via the matching transformer 956. As shown in FIG. 27, the polarity of the outputs of the amplifier 950 is opposite to the polarity of the outputs of the amplifier 952. In addition, the enable input of each amplifier is coupled to the frequency counter and amplifier controller 958 which is also coupled to the outputs of the amplifiers. According to the invention, the amplifiers 950, 952 are turned on at one time by the frequency counter and amplifier controller 958. It will be appreciated that the phase of the outputs of the amplifiers differs by 180° or $\pi$. Thus, in order to apply or remove a phase shift, one of the amplifiers is turned off and the other is turned on. Those skilled in the art will appreciate that other circuits can be utilized to produce substantially the same type of phase shifting and that the circuit of FIG. 27 is merely one example. According to the example shown in FIG. 27, the frequency counter and amplifier controller 958 monitors the output of the amplifier 950 and detects when the frequency passes beyond the optimal gain area as described above, e.g., increases by 100 Khz. When the frequency increases by a preselected amount, the frequency counter and amplifier controller 958 turns off amplifier 950 and turns on amplifier 952. The frequency counter and amplifier controller 958 then monitors the output of amplifier 952. After the frequency increases by an additional preselected amount, e.g. 100 Khz, the frequency counter and amplifier controller 958 turns off amplifier 952 and turns on amplifier 950. While the frequency counter and amplifier controller 958 is monitoring frequencies, the frequencies are passed to the output processor and weight display 960 which analyzes the frequency of oscillation, correlates the frequency with a particular weight according to the methods described in the parent application, and displays the weight.

Figure 28:
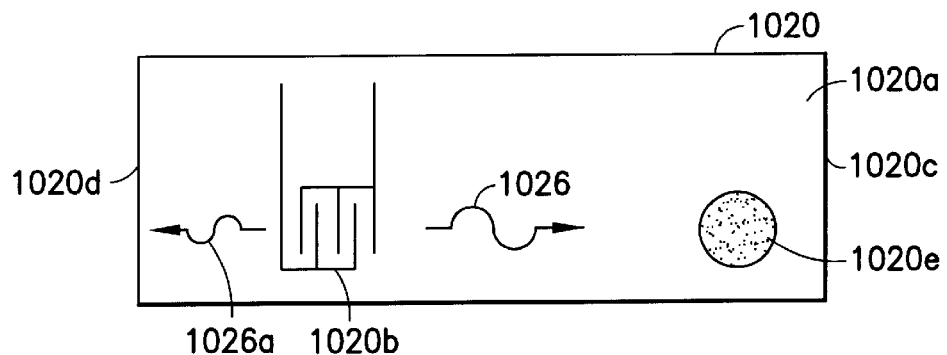
FIG. 28 is an enlarged schematic plan view of a transducer according to the invention illustrating the propagation of SAW waves.
Figure 29:
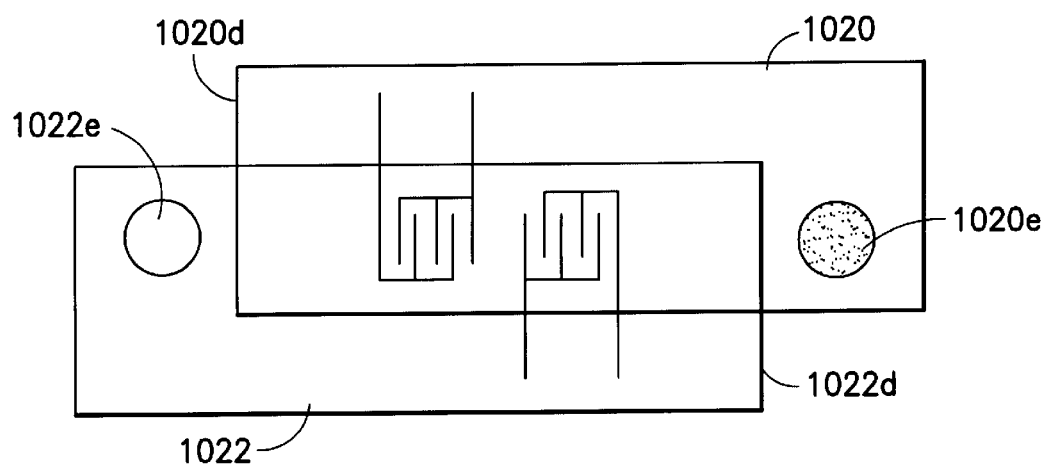
FIG. 29 is a schematic transparent view of two transducers of the type shown in FIG. 28 in operative alignment.
Figure 30:
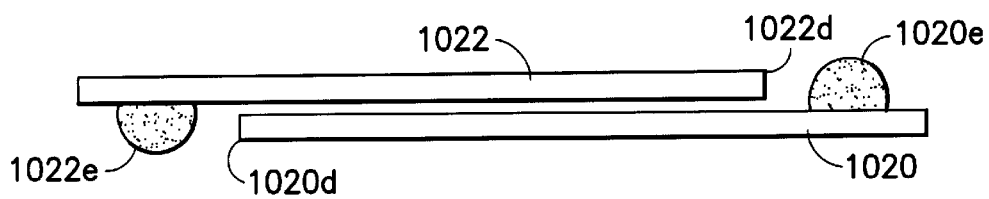
FIG. 30 is an enlarged schematic side elevation view of the transducer system of FIG. 29.
Figure 31:
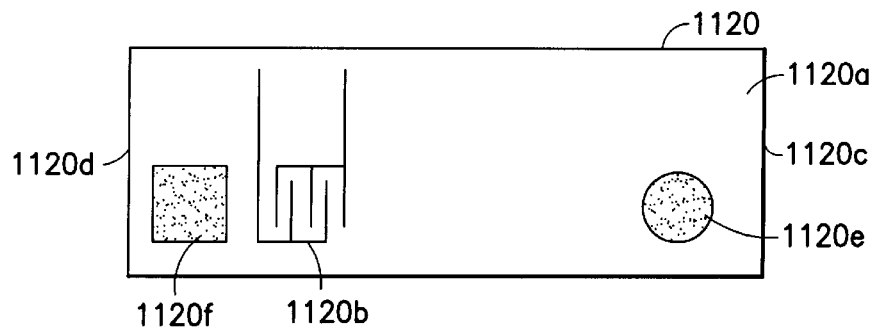
FIG. 31 is a view similar to FIG. 28 showing one embodiment of a transducer with two surface dampers.

Turning now to FIGS. 28–30, those skilled in the art will appreciate that the transducers, e,g, transducer 1020 in FIG. 28 propagate SAW waves in several directions. In a transducer having a so-called "uni-directional topology", a primary SAW wave 1026 is propagated by the electrodes 1020b toward the edge 1020c and is damped by the anti-reflection damper 1020e as described above. Another, albeit lower amplitude SAW wave 1026a is propagated in the opposite direction toward edge 1020d. It is desirable that additional anti-reflection damping be provided for this wave also. However, as can be seen from FIGS. 29 and 30, there is no room between the transducers 1020 and 1022 to provide dampers like 1020e and 1022e while still maintaining the close spacing between the transducers. FIG. 31 shows one solution to the problem.

As shown in FIG. 31, the transducer 1120 is provided with a thin anti-reflection damper 1120f between the electrodes 1120b and the edge 1120d. The damper 1120f is made from a layer of MYLAR which is approximately three microns thick. The MYLAR is glued to the substrate 1120a. One disadvantage of this solution is that the glue used to affix the MYLAR is approximately seven microns thick. The resulting thickness of approximately ten microns is too thick to maintain the optimal close spacing desired between two transducers. A different solution is shown in FIGS. 32 and 33.

Figure 32:
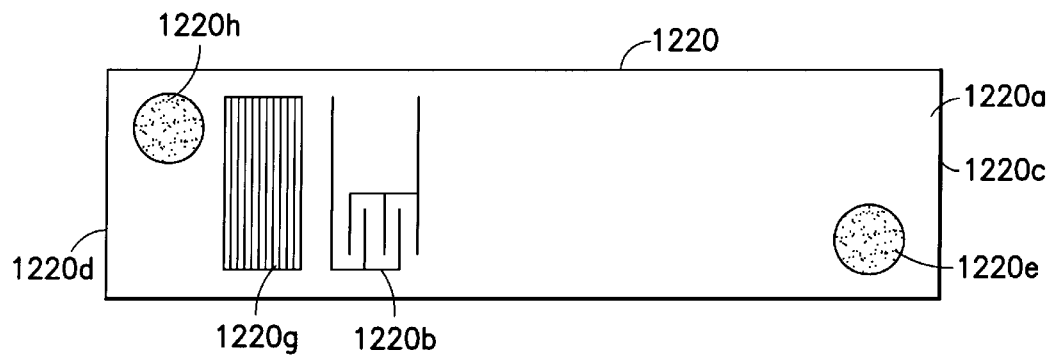
FIG. 32 is a view similar to FIG. 28 showing another embodiment of a transducer with two surface dampers.

The transducer 1220 shown in FIG. 32 is provided with a multistrip coupler 1220g and an anti-reflection damper 1220h which is similar in size to the damper 1220e. The coupler 1220g is made from an aluminized pattern which is printed on the substrate 1220a and which is designed to redirect SAW waves from the electrodes 1220b toward the damper 1220h. According to a presently preferred embodiment, the coupler includes one hundred parallel lines spaced with a period of approximately 0.7 times the wavelength of the SAW waves. Those skilled in the art will appreciate that types of couplers, using different patterns, can achieve similar results.

Figure 33:
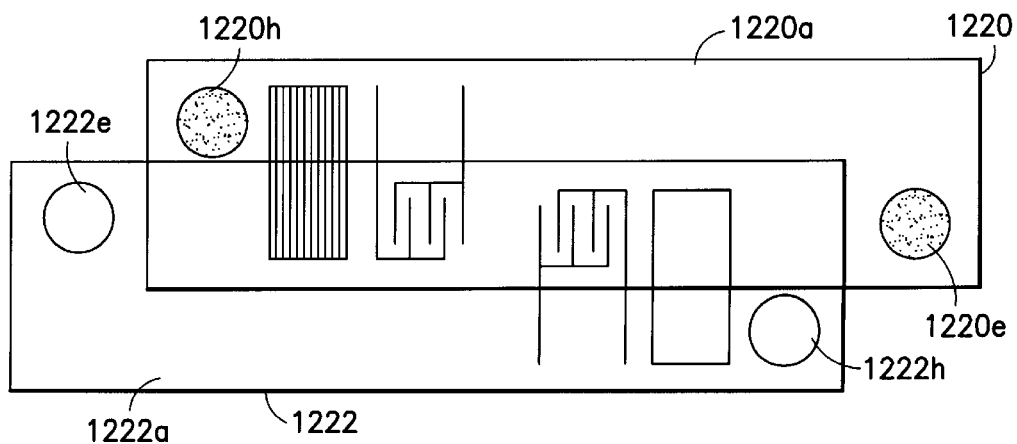
FIG. 33 is a view similar to FIG. 29 showing two of the transducers of FIG. 32 in operative alignment.

As shown in FIG. 33, the arrangement of FIG. 32 allows the close placement of two transducers 1220 and 1222 with relatively thick dampers 1220e, 1220h, 1222e, 122h while maintaining a close spacing between the substrates 1220a, 1222a.

Figure 34:
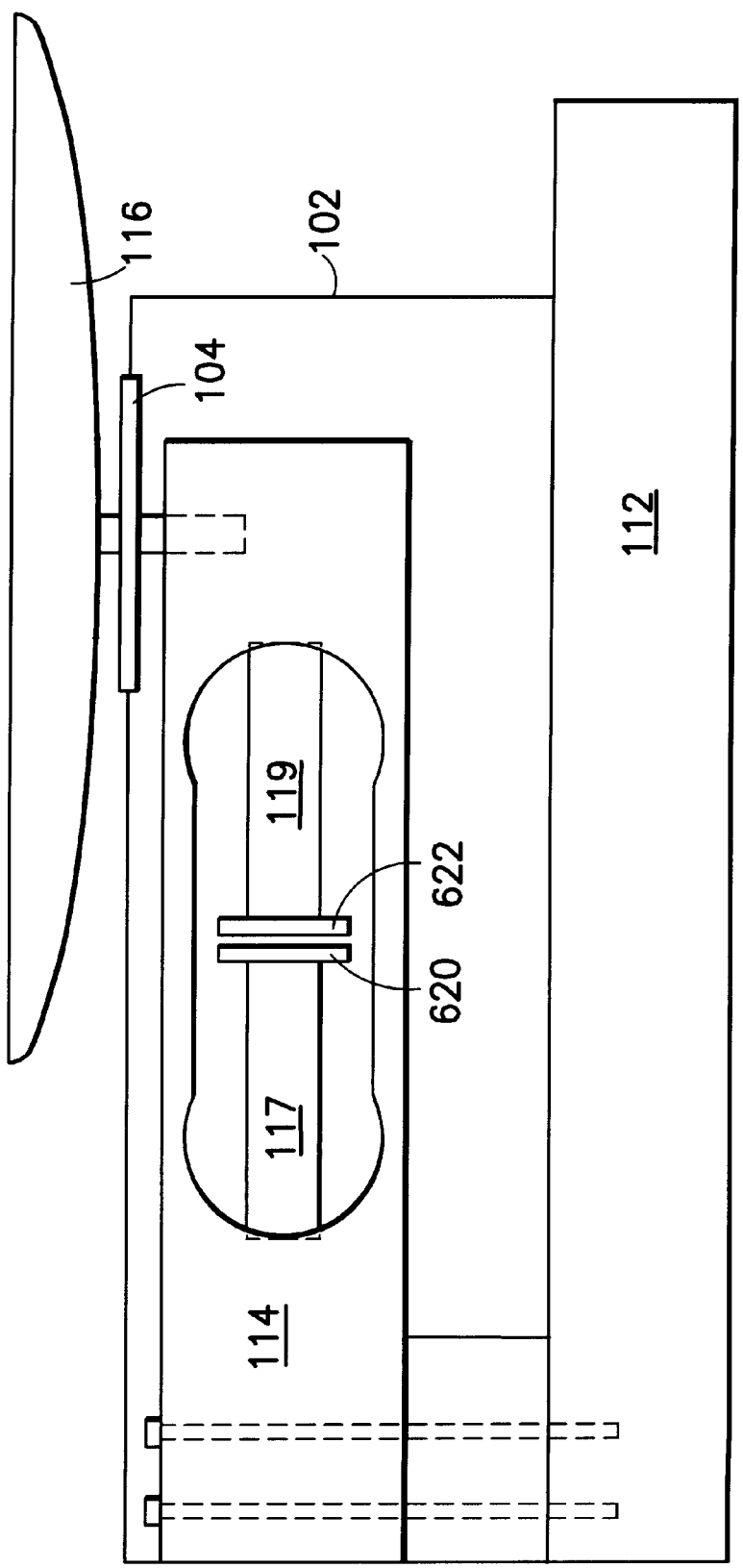
FIG. 34 is a view similar to FIG. 1 illustrating one way of sealing the transducers.

As mentioned above, in order to assure good long term stability, it is desirable that the transducers be sealed. Turning now to FIG. 34, a weighing apparatus 110 is similar to the apparatus 10 shown in FIG. 1 with similar reference numerals (increased by 100) referring to similar structure. As shown in FIG. 34, transducers 620, 622 (having on board temperature sensors) are sealed by providing a sealing box 102 which covers the entire elastic member 114. A rolling diaphragm 104 permits movement of the elastic member 114 and the load platform 116 relative to the box 102.

Figure 35:
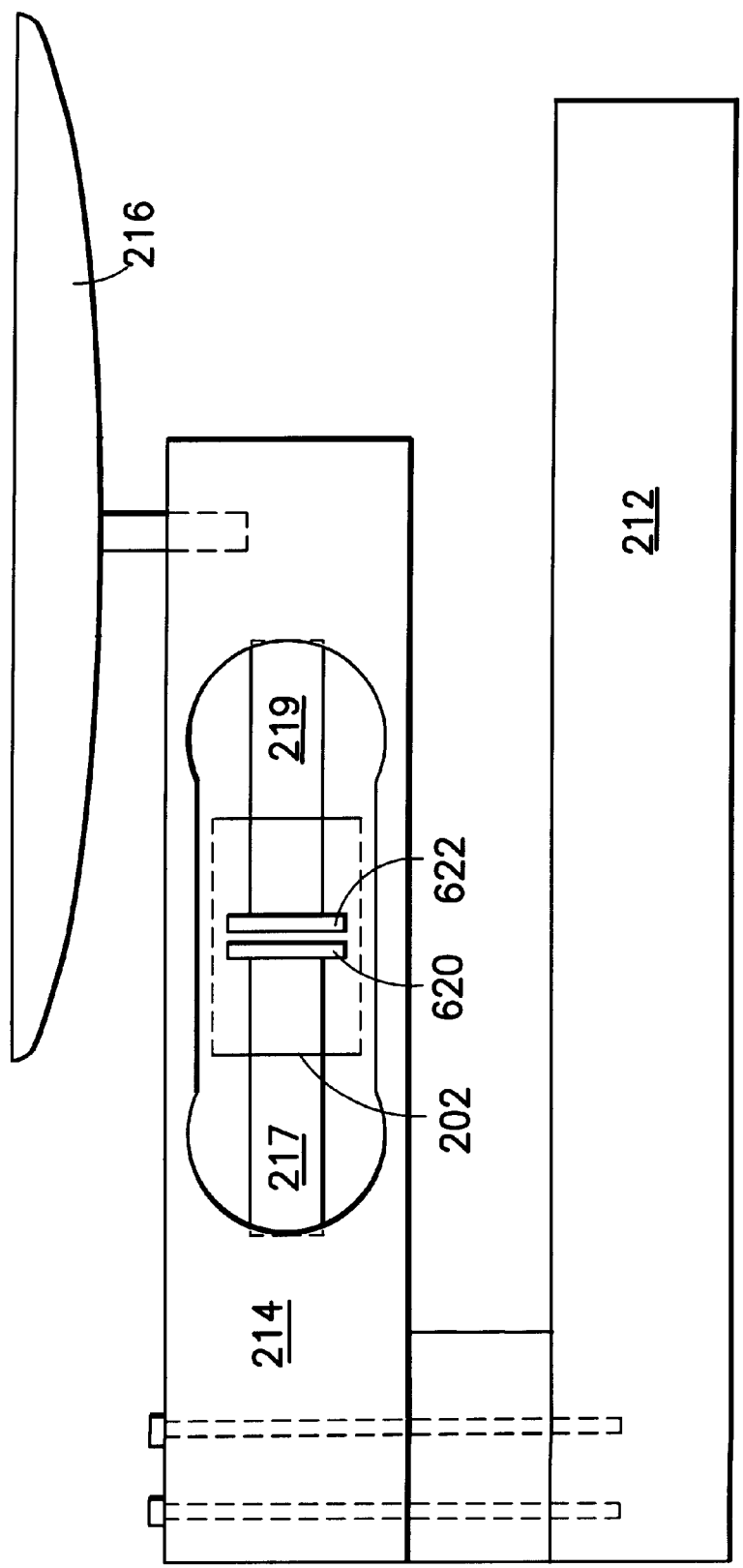
FIG. 35 is a view similar to FIG. 1 illustrating another way of sealing the transducers.

Another way to seal the transducers is shown in FIG. 35 which illustrates a weighing apparatus 210 is similar to the apparatus 10 shown in FIG. 1 with similar reference numerals (increased by 200) referring to similar structure. According to this embodiment, a flexible sleeve 202 is placed over the transducers 620, 622 and sealed to the posts 217, 219. The sleeve may be made of a light weight LATEX or similar material. It will be appreciated that other methods of sealing the transducers can yield similar results.

As mentioned above, the effects of temperature and long term degradation can be further corrected by providing a seperate hermetically sealed SAW temperature sensor in addition to the temperature sensors on board the transducers in the elastic member. This is particularly useful if the temperature sensors on board the transducers in the elastic member are not hermetically sealed or if the seal (102, 202) is not perfectly hermetic. According to this aspect of the invention, two weight corrections can be made based on the temperature sensed by the hermetically sealed unit. As shown in equation 6, the effects of temperature on the elastic member (114, 214) can be compensated for to yield a corrected weight Wc from a non-corrected weight Wn based on the temperature To in ° C. of the hermetically sealed transducer at the time the weight is measured and the temperature Tc in ° C. of the hermetically sealed transducer at the time the unit was calibrated. The constant $55 \times 10^{-5}$ is based on a Youngs modulus as well as other parameters for a particular aluminum elastic member. Other elastic members will require a different constant.

$$Wc = Wn + (Wn * (Tc - To) * (55 \times 10^{-5})) \tag{6}$$

It will be appreciated that equation 6 may be implemented using any highly accurate temperature sensor. As shown in equation 7, long term effects (such as absorption of water vapor and other degredation effects due to incomplete sealing) on the weight measuring transducer can be compensated for to yield a corrected weight Wc based on the uncorrected weight Wn, the reading Th (in Mhz) sensed by the hermetically sealed transducer, and the reading Tn (in Mhz) sensed by the non-sealed temperature sensor, where fc is the center frequency (in Mhz) for both sensors.

$$Wc = Wn - \left(Wn * \frac{Th - Tn}{fc}\right) \tag{7}$$

There have been described and illustrated herein several embodiments of an electronic weighing apparatus utilizing surface acoustic waves. While particular embodiments of the invention have been described, it is not intended that the invention be limited thereto, as it is intended that the invention be as broad in scope as the art will allow and that the specification be read likewise. Thus, while particular geometries of the base, elastic member, and load platform have been disclosed, it will be appreciated that other geometries could be utilized. Also, while particular wavelengths have been disclosed, it will be recognized that other wavelengths could be used with similar results obtained. Moreover, while particular configurations have been disclosed in reference to the location of transmitting and receiving electrodes, it will be appreciated that the respective locations of transmitters and receivers could be reversed. Furthermore, while several different aspects of the invention have been disclosed as solving various problems, it will be understood that the different aspects of the invention may be used in combination with each other in configurations other than those shown. It will therefore be appreciated by those skilled in the art that yet other modifications could be made to the provided invention without deviating from its spirit and scope as so claimed.

What is claimed is:

1. An electronic weighing apparatus, comprising:
   a) a displaceable elastic member means for receiving a load and being displaced by the load such that the displacement of said elastic member means is related to the weight of the load;
   b) a first piezoelectric transducer having a first substrate and a first surface acoustic wave (SAW) transmitter, said first piezoelectric transducer being coupled to said elastic member;
   c) a second piezoelectric transducer having a second substrate and a first SAW receiver, said second piezoelectric transducer being mounted in close proximity to said first piezoelectric transducer such that said displacement of said elastic member causes a corresponding displacement of one of said first and second piezoelectric transducers relative to each other;

d) a first amplifier having an input and an output, said input of said first amplifier being coupled to said first SAW receiver and said output of said first amplifier being coupled to said first SAW transmitter such that said first piezoelectric transducer, said first amplifier, and said second piezoelectric transducer form a first oscillator having a first output frequency;

e) processor means coupled to said output of said first amplifier; and f) sealing means covering said first and second piezoelectric transducers for sealing out moisture and other contaminants, wherein displacement of said elastic member means causes a displacement of one of said first and second piezoelectric transducers relative to each other and thereby changes said first output frequency, and said first output frequency is used by said processor means to determine an indication of the weight of the load.

2. An electronic weighing apparatus according to claim 1, wherein:

said sealing means is an hermetic seal.

3. An electronic weighing apparatus according to claim 1, wherein:

said sealing means is a flexible sleeve.

4. An electronic weighing apparatus, comprising:

a) a displaceable elastic member means for receiving a load and being displaced by the load such that the displacement of said elastic member means is related to the weight of the load;

b) a first piezoelectric transducer having a first substrate and a first surface acoustic wave (SAW) transmitter, said first piezoelectric transducer being coupled to said elastic member;

c) a second piezoelectric transducer having a second substrate and a first SAW receiver, said second piezoelectric transducer being mounted in close proximity to said first piezoelectric transducer such that said displacement of said elastic member causes a corresponding displacement of one of said first and second piezoelectric transducers relative to each other;

d) a first amplifier having an input and an output, said input of said first amplifier being coupled to said first SAW receiver and said output of said first amplifier being coupled to said first SAW transmitter such that said first piezoelectric transducer, said first amplifier, and said second piezoelectric transducer form a first oscillator having a first output frequency;

e) processor means coupled to said output of said first amplifier; and f) an hermetically sealed temperature sensor having an output coupled to said processor means, wherein displacement of said elastic member means causes a displacement of one of said first and second piezoelectric transducers relative to each other and thereby changes said first output frequency, and said first output frequency is used by said processor means to determine an indication of the weight of the load and said processor means uses said output of said hermetically sealed temperature sensor to compensate for the effects of temperature on said output of said first amplifier.

5. An electronic weighing apparatus, comprising:

a) a displaceable elastic member means for receiving a load and being displaced by the load such that the displacement of said elastic member means is related to the weight of the load;

b) a first piezoelectric transducer having a first substrate and a first surface acoustic wave (SAW) transmitter, said first piezoelectric transducer being coupled to said elastic member;

c) a second piezoelectric transducer having a second substrate and a first SAW receiver, said second piezoelectric transducer being mounted in close proximity to said first piezoelectric transducer such that said displacement of said elastic member causes a corresponding displacement of one of said first and second piezoelectric transducers relative to each other;

d) a first amplifier having an input and an output, said input of said first amplifier being coupled to said first SAW receiver and said output of said first amplifier being coupled to said first SAW transmitter such that said first piezoelectric transducer, said first amplifier, and said second piezoelectric transducer form a first oscillator having a first output frequency; and e) processor means coupled to said output of said first amplifier, wherein one of said first and second piezoelectric transducers is provided with two anti-reflection structures to minimize reflection of surface acoustic waves, and displacement of said elastic member means causes a displacement of one of said first and second piezoelectric transducers relative to each other and thereby changes said first output frequency, and said first output frequency is used by said processor means to determine an indication of the weight of the load.

6. An electronic weighing apparatus according to claim 5, wherein:

one of said two anti-reflection structures is a MYLAR film glued to said substrate.

7. An electronic weighing apparatus according to claim 5, wherein:

one of said two anti-reflection structures is a surface damper on said substrate with a multistrip coupler located between said surface damper and said SAW transmitter or receiver.

* * * * *